United States Patent [19]
Stoyanovitch

[11] 3,742,743
[45] July 3, 1973

[54] ANTI-THEFT DEVICE FOR MOTOR VEHICLES

[76] Inventor: Dragoslav S. Stoyanovitch, Feldberg Str. 22, 78 Freiburg-Hasloch, Germany

[22] Filed: Dec. 11, 1970

[21] Appl. No.: 65,633

[30] Foreign Application Priority Data
Sept. 1, 1969  Germany.................. P 19 44 299.0

[52] U.S. Cl..................................... 70/209, 70/225
[51] Int. Cl............................................. B60r 25/02
[58] Field of Search...................... 70/18, 175, 209, 70/225, 237; 74/495

[56] References Cited
UNITED STATES PATENTS
3,462,982   8/1969   Moore ................................. 70/209

FOREIGN PATENTS OR APPLICATIONS
106,072    3/1967   Denmark ............................. 70/209
1,127,524  9/1968   Great Britain ...................... 70/209

Primary Examiner—Albert G. Craig, Jr.
Attorney—Robert S. Swecker

[57] ABSTRACT

This anti-theft device consists of an elastic member ending with a soft ball, which is provided with a flexible metal net. By means of a bar, to which the other end of the said member is attached, this device can be fixed in a detachable way to the steering wheel.

6 Claims, 11 Drawing Figures

ANTI-THEFT DEVICE FOR MOTOR VEHICLES

BACKGROUND OF THE INVENTION

This invention relates to a locking device with the purpose to prevent the theft and the unauthorized use of motor vehicles having a steering wheel, by limiting the turning of the steering wheel.

The said device consists of an elastic member, of which an end carries a ball made of a soft material and which can be provided with a flexible metal net. With the other end, this device is firmly attached to a bar and by means of the said bar it can be fixed in a detachable way to the steering wheel, respectively between the steering wheel and the steering column.

Attached to a bar, this device is substantially longer than the diameter of the steering wheel to which it is to be applied. The bar, to which the said device is attached, in use as anti-theft device is fixed in a detachable way to the steering wheel but not attached or anchored to any other part of the motor vehicle. When the said bar is fixed to the steering wheel, the rotation of the steering wheel is limited to only that amount of rotation which can be obtained before one of the said balls comes into contact with a fixed part of the driving compartment or with the driver.

THE DRAWINGS

To enable the invention to be fully understood, it will be described by reference to the accompanying drawings in which.

Figure 1:
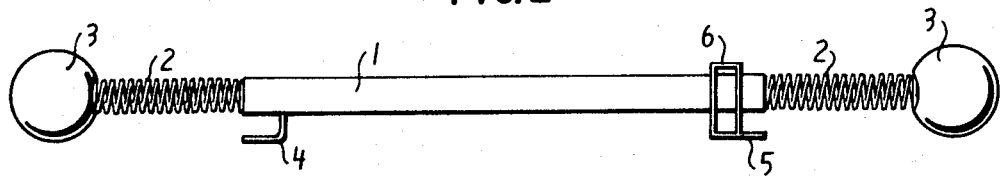
FIG. 1 shows a side view of a long bar with two elastic members-(parts), each carrying a ball.

Refering by numeral to the accompanying drawings this anti-theft device comprises a elastic member 2, made for example of one or more springs; an end of the said elastic member 2 carries a ball 3, or a similar part, made of a soft material, for example of rubber, and can be provided with a flexible metal net 9 lodged underneath the exterior layer of the said soft material, — with the purpose to prevent any malevolent damage of the said ball 3 and so of the interior of the car when the steering wheel is turning with the device fixed on it.

In order to be fixed in a detachable way to the steering wheel, this device can be firmly attached :
  either to a long bar 1,
  or to a short bar 7,
  or to a short bar 8 with an end being bent downwards.

Figure 2:
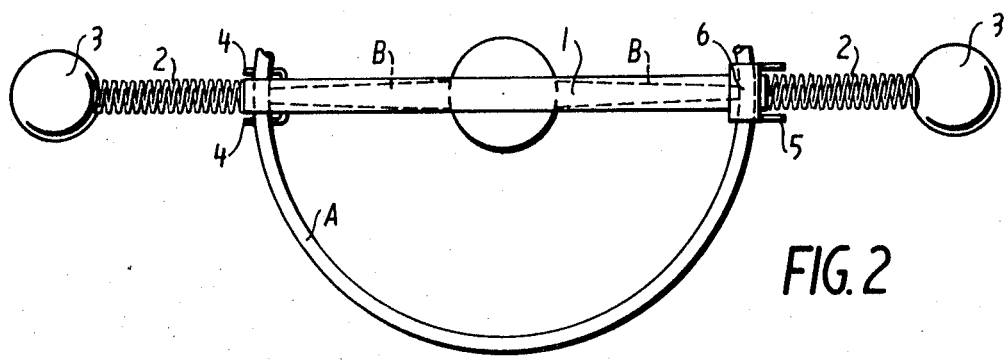
FIG. 2 shows a plan view of the device as drawn in FIG. 1, which is fixed at two spokes of the steering wheel.
Figure 3:
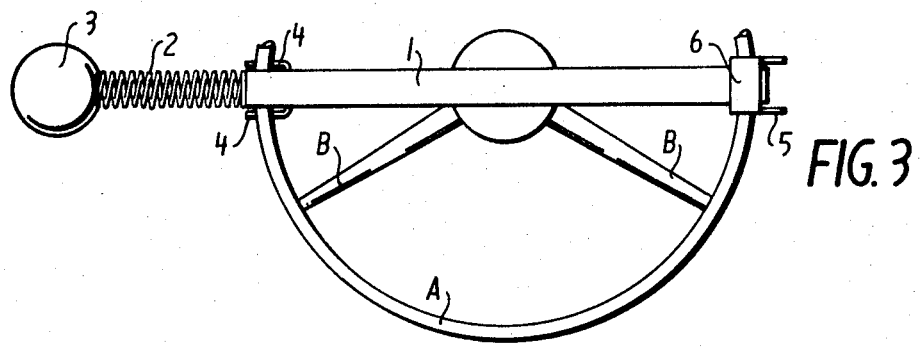
FIG. 3 shows a plan view of the same device, which is fixed between two opposite points of the steering wheel.
Figure 4:
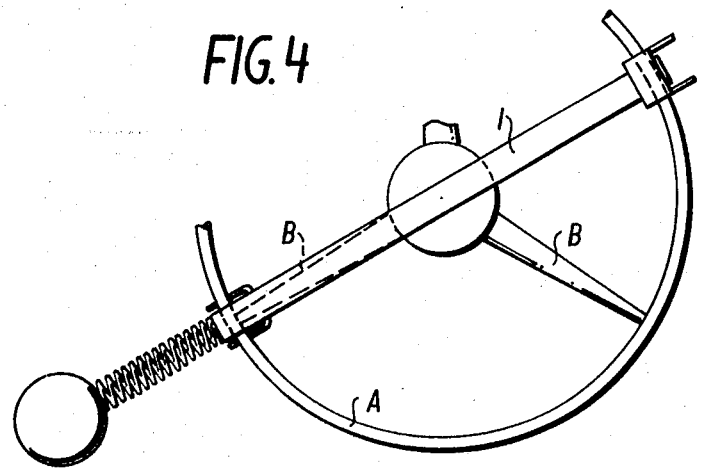
FIG. 4 shows a plan view of the same device, which is fixed between a spoke and the opposite point of the steering wheel.
Figure 7:
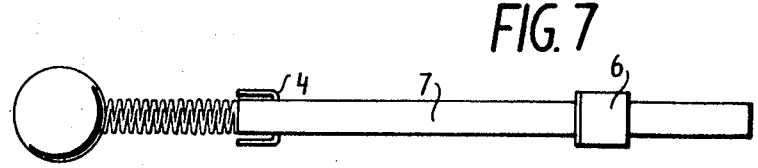
FIG. 7 shows a plan view of the device provided for to be fixed to only a spoke of the steering wheel.

When firmly attached to the said long bar 1, which is provided with two two-armed hooks 4,5, of which one provided with a locking mechanism 6 and attached to the said long bar 1 in a movable way, this device can be fixed in a detachable way to the steering wheel A
  either to two spokes B, as shown in FIG. 2,
  or between two opposite points of the steering wheel A, as shown in FIG. 3,
  or between a spoke B and the opposite point of the steering wheel A, as shown in FIG. 4.

The above described device will be fixed to the steering wheel A as follows: the hook 5 with the locking mechanism 6 will be pushed inwards, the device will be put from above to the steering wheel A so that two hooks 4,5 clamp round at the same time two spokes B and the steering wheel A, as shown in FIG. 2, resectively two opposite points of the steering wheel A, as shown in FIG. 3, respectively a spoke B and the opposite point of the steering wheel A, as shown in FIG. 4; — the hook 5 provided with the locking mechanism 6 will be pulled outwards and locked. The device is fixed to the steering wheel and cannot be removed without the key.

Figure 8:
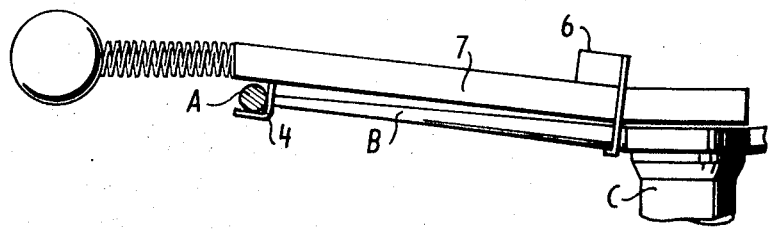
FIG. 8 shows a side view of the device as drawn in FIG. 7, which is fixed to the steering wheel.
Figure 9:
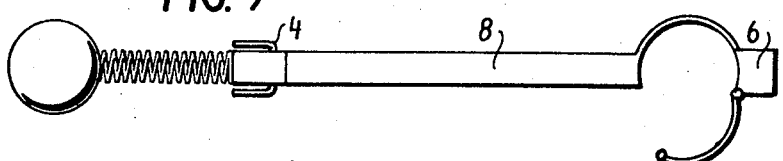
FIG. 9 shows a plan view of the device provided for to be fixed between a spoke of the steering wheel and the steering column.

When firmly attached to an end of a short bar 7, which is provided with a two-armed hook 4 and a locking mechanism 6, both firmly attached to the said bar 7, this device can be fixed in a detachable way to only one spoke B of the steering wheel A, as shown in FIG. 8.

In order to be fixed, this device has to be put from above to the steering wheel A so that the hook 4 and the locking mechanism 6 clamp round at the same time one spoke B and the steering wheel A, and the locking mechanism 6 has to be locked.

Figures 5, 10:
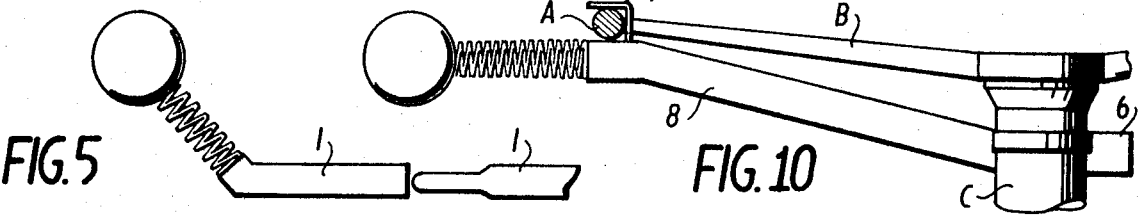
FIG. 5 shows a side view of a long bar consisting of two parts provided for to be connected together in a detachable way, with the elastic members runing downwards.
FIG. 10 shows a side view of the device as drawn in FIG. 9, which is fixed between the steering wheel and the steering column.
Figure 11:
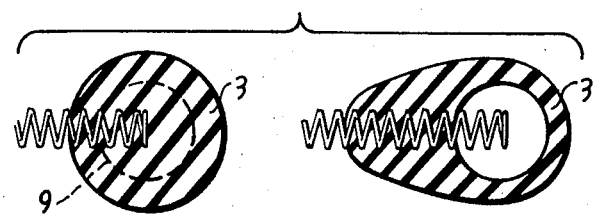
FIG. 11 shows a cross sectional view through two differently shaped balls, the first provided with a flexible metal net, which is lodged under-neath the exterior layer of the soft material.

When firmly attached to a short bar 8, which is provided with a two-armed hook 4 and a locking mechanism 6, the other end of the said bar 8 being bent downwards, this device can be fixed in a detachable way between a spoke B of the steering wheel A and the steering colomn C, as shown in FIG. 10.

In order to be fixed, the said device has to be put from below to the steering wheel A, so that the hook 4 clamps round a spoke B of the steering wheel A and the locking mechanism 6 has to be locked around the steering colomn C.

For an easier storage of this device in the car, while not in use, the long bar 1 can consist also of two parts connected in a detachable way, as shown in FIG. 5.

Figure 6:
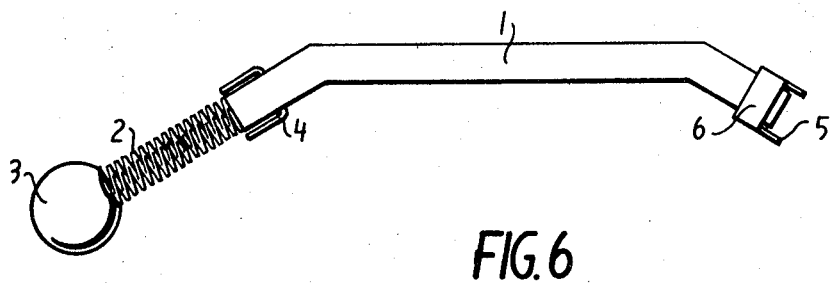
FIG. 6 shows a long bar with both ends bent, provided for to be fixed to the steering wheel by which the spokes do not run in a straight line.

For the steering wheel with the spokes which do not run in a straight line, the long bar 1 can be bent at both ends, as shown in FIG. 6.

In order to make possible that this device can be fixed to the steering wheel without any difficulty, the hooks 4,5 can be attached to the said bars 1,7,8 in a movable way, so that they can be turned to the right and to the left.

The hooks 4,5 can be also made with only an arm, as shown in FIG. 5.

The elastic parts and the balls have the function to prevent damage of the inside of the car in case of the rotation of the steering wheel with the said device fixed on it; the flexible metal net, which is lodged underneath the exterior layer of the soft material, of which are made the balls, has to prevent the thief to cut off the said ball and then to damage the interior of the car while turning the steering wheel.

The advantage of this invention consists firstly in a seeing effect with the purpose to warn the possible thief that it will be nearly impossible to steal the car and so to discourage him not even to attempt to break into the car, and secondly the said device, which has to be made very robust, has for purpose to prevent the turning of the steering wheel and accordingly the driving of the car, if the thief succeed to enter the car and to start the motor.

What I claim is:

1. An anti-theft apparatus for motor vehicles comprising:
   an elongate rigid member;
   attachment means disposed on said rigid member for detachably engaging a portion of a motor vehicle steering wheel assembly;
   an elongate flexible member connected to said rigid member and projecting outwardly from an end of said rigid member;
   a ball member connected to said elongage flexible member and spaced outwardly from said rigid member; and locking means cooperable with said attachment means for selectively securing said rigid member to a portion of the motor vehicle steering wheel assembly whereby when said rigid member is affixed to a steering wheel assembly by said attachment means and said locking means, said elongate flexible member and said ball member cooperate to engage said ball member with either an occupant or a surface of the motor vehicle to impair a rotation of the steering wheel and thereby prevent theft of the motor vehicle.

2. An anti-theft apparatus according to claim 1 wherein said attachment means comprises means for affixing said rigid member to a spoke on the motor vehicle steering wheel.

3. An anti-theft apparatus according to claim 1 wherein said attachment means comprises means for affixing said rigid member to a steering column portion of said motor vehicle steering wheel assembly.

4. An anti-theft apparatus according to claim 3 wherein said affixing means passes completely around the motor vehicle steering column.

5. An anit-theft apparatus according to claim 1 wherein said ball member is disposed around a metallic net attached to said elongate flexible means for preventing a removal of said ball member from said apparatus.

6. An anti-theft apparatus according to claim 1 wherein said rigid member comprises a plurality of short rigid members which are detachably interconnectable.

* * * * *